US011640391B2

(12) United States Patent
Loaiza et al.

(10) Patent No.: US 11,640,391 B2
(45) Date of Patent: May 2, 2023

(54) SUPPORTING BLOCKCHAIN COLLECTIONS IN A DATABASE

(71) Applicant: Oracle International Corporation, Redwood Shores, CA (US)

(72) Inventors: Juan R. Loaiza, Woodside, CA (US); Wei-Ming Hu, Palo Alto, CA (US); Amrish Srivastava, San Ramon, CA (US); Mahesh Baburao Girkar, Cupertino, CA (US); James W. Stamos, Saratoga, CA (US); Sachin Sonawane, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 119 days.

(21) Appl. No.: 16/923,279

(22) Filed: Jul. 8, 2020

(65) Prior Publication Data
US 2021/0073209 A1 Mar. 11, 2021

Related U.S. Application Data

(60) Provisional application No. 62/899,019, filed on Sep. 11, 2019.

(51) Int. Cl.
*G06F 16/23* (2019.01)
*G06F 16/2455* (2019.01)
(Continued)

(52) U.S. Cl.
CPC ........ *G06F 16/2379* (2019.01); *G06F 16/221* (2019.01); *H04L 9/0643* (2013.01); *H04L 9/50* (2022.05)

(58) Field of Classification Search
CPC .............. G06F 16/2379; G06F 16/221; G06F 16/2255; G06F 16/2282; G06F 21/602;
(Continued)

(56) References Cited

U.S. PATENT DOCUMENTS 8,156,083 B2 4/2012 Banerjee et al.
9,384,222 B2 7/2016 Banerjee et al.
(Continued)

FOREIGN PATENT DOCUMENTS

WO WO2017/161275 9/2017

OTHER PUBLICATIONS

Ezhilchelvan et al., "Non-Blocking Two Phase Commit Using Blockchain", 1st Workshop on Cryptocurrencies and Blockchains Distributed Systems, CryBlock'18, dated Jan. 1, 2018, pp. 36-41.
(Continued)

*Primary Examiner* — Apu M Mofiz
*Assistant Examiner* — Oscar Wehovz
(74) *Attorney, Agent, or Firm* — Hickman Becker Bingham Ledesma LLP; Brian N. Miller

(57) ABSTRACT

Herein are high throughput techniques for incorporating cryptographic blockchains into relational data. In an embodiment, a computer indicates, in a database dictionary in a database, that a relational table is for blockchain storage. The relational table contains application column(s). In response to that indication, the relational table is associated with system column(s) that are unmodifiable by administrators and clients of the database. The system column(s) include a cryptographic hash column. A request to store a particular value in a particular application column is received from a client. In response to receiving the request, a cryptographic hash value is calculated for a new row for the relational table. In the relational table, the computer stores the new row that contains: the particular value in the particular application column, and the cryptographic hash value in the cryptographic hash column.

23 Claims, 5 Drawing Sheets

DATABASE MANAGEMENT SYSTEM 100

(51) Int. Cl.
- *H04L 9/06* (2006.01)
- *G06F 16/22* (2019.01)
- *H04L 9/00* (2022.01)

(58) Field of Classification Search
CPC ....... G06F 21/62; G06F 21/64; H04L 9/0643; H04L 2209/38; H04L 63/12; H04L 9/3239; H04L 9/3247; H04L 9/50
See application file for complete search history.

(56) References Cited

U.S. PATENT DOCUMENTS

| | | | |
|---|---|---|---|
| 9,589,041 | B2 | 3/2017 | Tran et al. |
| 9,747,356 | B2 | 8/2017 | Lu et al. |
| 9,767,178 | B2 | 9/2017 | Srivastava et al. |
| 9,830,372 | B2 | 11/2017 | Rajamani et al. |
| 10,191,932 | B2 | 1/2019 | Lehouillier et al. |
| 2002/0095408 | A1* | 7/2002 | Cheng .................. G06F 16/284 |
| 2014/0379679 | A1* | 12/2014 | Kohno ................ G06F 16/2343 707/704 |
| 2017/0228371 | A1 | 8/2017 | Seger, II |
| 2018/0096163 | A1 | 4/2018 | Jacques et al. |
| 2018/0374086 | A1 | 12/2018 | Ardashev et al. |
| 2019/0179939 | A1* | 6/2019 | Govindarajan ..... G06F 11/1474 |
| 2019/0238525 | A1 | 8/2019 | Padmanabhan et al. |
| 2019/0356674 | A1 | 11/2019 | Irazabal et al. |
| 2020/0050613 | A1* | 2/2020 | Gauvreau, Jr. ....... H04L 9/0643 |
| 2020/0142992 | A1* | 5/2020 | Ocher .................. G06F 16/235 |
| 2020/0167243 | A1 | 5/2020 | Rauh et al. |
| 2020/0250177 | A1* | 8/2020 | Padmanabhan ......... G06F 16/27 |
| 2020/0364201 | A1 | 11/2020 | Cseri et al. |
| 2020/0374106 | A1 | 11/2020 | Padmanabhan |
| 2022/0035652 | A1 | 2/2022 | Stamos et al. |

OTHER PUBLICATIONS

Cucurull et al., "Distributed Immutalilization of Secure Logs", dated Sep. 17, 2016, Big Data Analytics in the Social and Ubiquitous Context, 16 pages.

Anonymous: "Two-Phase Commit Protocol—Wikipedia", dated Mar. 4, 2019, https://en.wikipedia.org/w/index.php?title=Two-phase_commit_protocol&oldid=886121497, retrieved on Sep. 28, 2020, 10 pages.

Anonymous: "Raft (computer science)—Wikipedia", dated May 2, 2019, https://en,wikipedia.org/w/index.php?title=Raft _computer_science)&oldid=895121718, dated Sep. 28, 2020.

Wikipedia, the free encyclopedia, "B+ tree", https://en.wikipedia.org/wiki/B%2B_tree, last viewed on Jan. 5, 2021, 6 pages.

Anonymous: "Learning Key 20c New Features for Database Administrators", Details: Oracle Blockchain Table, dated Feb. 14, 2020, 4 pages.

Wang et al., "Formal Specification and Verification of Smart Contracts in Azure Blockchain", dated Apr. 29, 2019, 13 pages.

Samaniego et al., "Blockchain as a Service for IoT", 2016 IEEE International Conference on Internet of Things (iThings), 4 pages.

Rimba et al., "Comparing Blockchain and Cloud Services for Business Process Execution", dated n 2017, 4 pages.

Ellis et al., "ChainLink A Decentralized Oracle Network", dated Sep. 4, 2017, 38 pages.

Allen et al., "Veritas: Shared Verifiable Databases and Tables in the Cloud", CIDR'19, dated Jan. 2019, CA, 9 pages.

Muzammal et al., "Renovating Blockchain with Distributed Databases: An Open Source System", Future Generation Computer Systems, Jul. 23, 2018, 27 pages.

"16.9 Using Flashback Data Archive", Oracle Database Development Guide, 12c Release 1 (12.1), May 2016, 4 pages.

* cited by examiner

FIG. 3

DATABASE MANAGEMENT SYSTEM 300

COMPUTER 311

DATABASE INSTANCE 321

RELATIONAL TABLE 331A

| CHAIN ID COLUMN 341A | VERSION COLUMN 342A | RECORD ID COLUMN 343A |
|---|---|---|
| C | 0 | W |
| C | 0 | X |
| D | 0 | Y |
| C | 1 | X |
| E | 0 | Z |
| F | 0 | V |
| G | 0 | U |

RELATIONAL TABLE 332

| CHAIN ID COLUMN 344 | VERSION COLUMN 345 | RECORD ID COLUMN 346 |
|---|---|---|
| D | 0 | T |
| C | 2 | X |

COMPUTER 312

DATABASE INSTANCE 322

RELATIONAL TABLE 331B

| CHAIN ID COLUMN 341B | VERSION COLUMN 342B | RECORD ID COLUMN 343B |
|---|---|---|
| E | 0 | S |
| F | 1 | V |

SUPPORTING BLOCKCHAIN COLLECTIONS IN A DATABASE

BENEFIT CLAIM

This application claims the benefit of Provisional Appln. 62/899,019, filed Sep. 11, 2019, the entire contents of which is hereby incorporated by reference as if fully set forth herein, under 35 U.S.C. § 119(e).

FIELD OF THE INVENTION

The present invention relates to database data integrity. Herein are high throughput techniques for incorporating cryptographic blockchains into relational data.

BACKGROUND

Blockchains use cryptography for integrity of durable transactions. Transaction integrity entails features such as non-repudiation and evidence of tampering.

In one approach, a decentralized blockchain like Hyperledger Fabric uses cryptographic hashing to link blocks together to form a tamper-resistant chain when there are multiple untrusted writers and no single point of trust. Transaction throughput and transaction latency suffer because of the distributed nature of a decentralized solution.

Another approach involves a database system that provides a cryptographically verifiable transaction log owned by a central trusted authority. This approach has several drawbacks. The transaction log is automatically maintained as a side effect of database changes and is not a first-class object that can be used as a ledger by an application. Furthermore, the transaction log has only a single chain that may be contentious, which can limit throughput.

BRIEF DESCRIPTION OF THE DRAWINGS

In the drawings:

FIG. 3 is a block diagram that depicts an example DBMS that flexibly integrates blockchains across multiple tables and/or multiple database instances;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Using cryptographic hashes to link together rows in an append-only table with optional digital signatures brings some of the blockchain benefits to a centralized database with modest overhead. This approach is applicable to a variety of data models including relational, columnar, key-value, and document.

If a database provider is at least partially trustworthy, blockchain techniques can be used to instill a higher level of trust and support multiple writers that do not trust each other. Introduced herein are variants of an approach referred to herein as Database Blockchain Collections. Database Blockchain Collections introduces the following features:

1. Using blockchain techniques in a database for a first-class collection that is declared to be append-only. Depending on the data model, the collection could be a relational table, a key-value collection, a document collection, etc.
2. Supporting multiple chains within such a collection for scalability within and across database instances.
3. Supporting row retention in such a collection in a declarative manner.
4. Supporting collection lifetime in a declarative manner.
5. Supporting verification of chains in such collections.

In an embodiment, a computer indicates, in a database dictionary in a database, that a relational table is for blockchain storage. The relational table contains application column(s). In response to that indication, the relational table is associated with system column(s) that are unmodifiable by administrators and clients of the database. The system column(s) include a cryptographic hash column. A request to store a particular value in a particular application column is received from a client. In response to receiving the request, a cryptographic hash value is calculated for a new row for the relational table. In the relational table, the computer stores the new row that contains: the particular value in the particular application column, and the cryptographic hash value in the cryptographic hash column.

1.0 Example Database Management System

Figure 1:
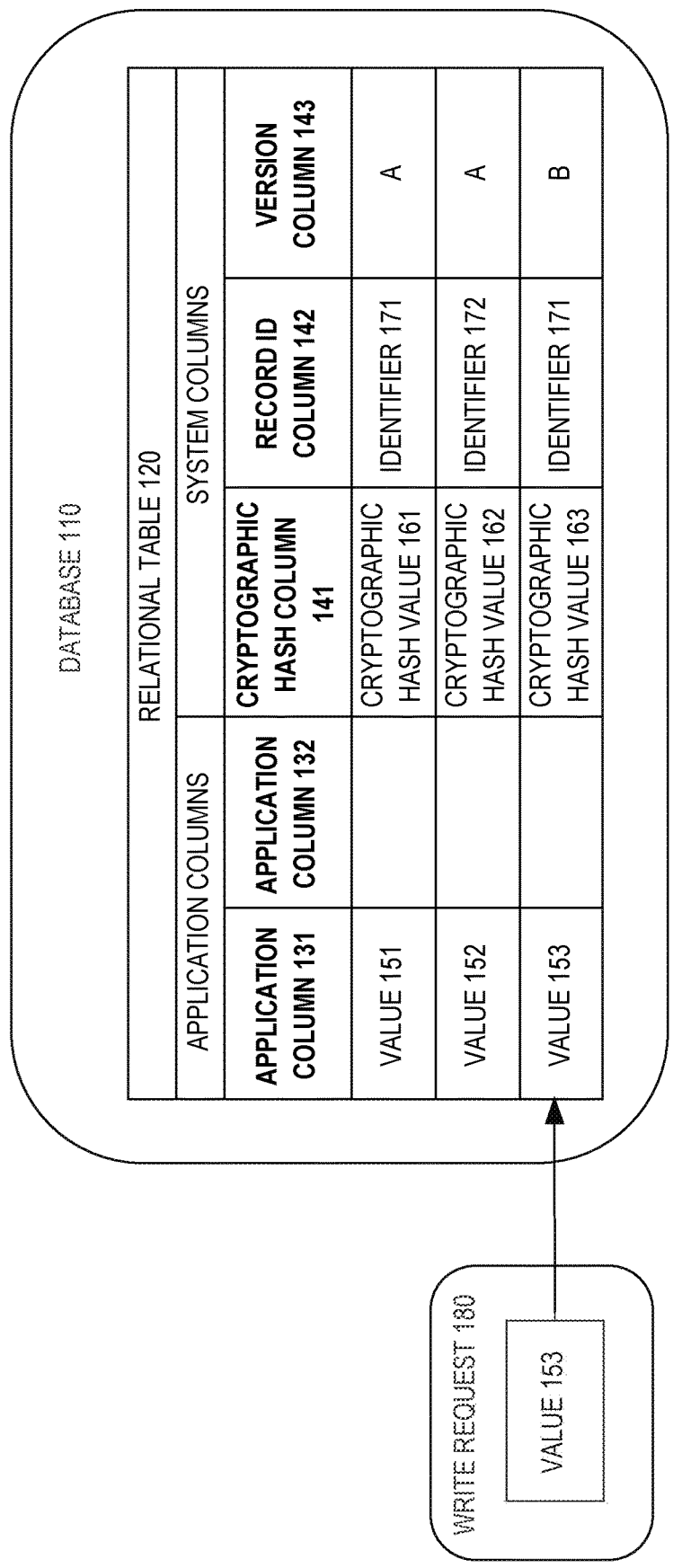
FIG. 1 is a block diagram that depicts an example database management system (DBMS) that makes a relational table tamper resistant and tamper evident based on blockchain(s)

FIG. 1 is a block diagram that depicts an example database management system (DBMS) 100, in an embodiment. DBMS 100 makes relational table 120 tamper resistant and tamper evident based on blockchain(s). DBMS 100 includes and is hosted by at least one computer that may be a rack server such as a blade, a personal computer, a mainframe, a virtual computer, or other computing device.

DBMS 100, such as a relational DBMS (RDBMS), contains at least one database, such as 110. In an embodiment and according to a schema and/or database dictionary, database 110 contains at least one relational table, such as 120, that may contain zero or more rows and at least one application column, such as 131-132. Database 110 and relational table 120 are exemplary. Other embodiments may have a datastore that is different from database 110, such as a graph database, a NoSQL database, a tuple store such as a resource description framework (RDF) triplestore, a key value store, or a document datastore such as for documents that contain JavaScript object notation (JSON) or extensible markup language (XML). For example, a columnar database may have a family of columns instead of relational table 120.

In an embodiment not shown such as a key value store, DBMS 100 may store application data as named (i.e. keyed) values, such as 151-153, individually. In an embodiment such as shown, values 151-153 may be organized as data fields within logical units of data aggregations such as records. In the shown example, a same field in multiple records may be logically organized as an application column, such as 131-132, such that all values 151-153 in a same column have a same datatype, which is the datatype of the column. For example, values 151-153 may be numeric.

In the shown embodiment, various semantic objects are stored in relational table 120 as one or more table rows as follows. In the shown embodiment, relational table 120 more or less operates as a versioned table with self contained auditable history as follows.

Relational table 120 stores logical records. For each record, relational table 120 stores current and past versions as table rows. In the shown embodiment, relational table 120 links all versions of a same record into a respective blockchain of cryptographic blocks that are linked together. In the shown embodiment, each version of a same record has a separate block in the blockchain.

In the shown embodiment, there is a one-to-one correspondence of a blockchain to a logical record. In the shown embodiment, there is a one-to-one correspondence of a block and a version of the record. In the shown embodiment, there is a one-to-one correspondence of a record version and a row of relational table 120.

As discussed later herein, such one-to-one correspondence of such logical objects may be absent in other embodiments. For example, a block may correspond to a transaction, client, or session of a database as discussed later herein.

In this example, a blockchain and a logical record may be more or less synonymous and may share an identifier such as identifiers 171-172 in record identifier column 142. Likewise, a block, a record version, and a table row may be more or less synonymous and may share an identifier such as identifiers such as A-B in version column 143.

In this example, columns 142-143 together may operate as a candidate key to identify exactly one row of relational table 120. Each logical record has its own respective sequence of versions, such that multiple rows shown as version A may be first versions of unrelated respective logical records 171-172.

In an embodiment, DBMS 100 may cooperate with client application(s) that use application columns 131-132 to store and retrieve fields of application records. In various embodiments, DBMS 100 may provide additional features such as atomic, consistent, isolated, durable (ACID) transactions, data persistence, data manipulation language (DML) such as for queries, data definition language (DDL) such as for schema evolution, and/or data control language (DCL) for access authorization. For example, DML may provide create, read, update, delete (CRUD) operations for ad hoc access and/or batching.

In operation, a client may send write request 180 to DBMS 100. For example write request 180 may be an update statement in the form of a DML statement such as a SQL update statement. Relational table 120 has special behavior that occurs when modification of an existing row, such as A as shown, is attempted, such as by write request 180. When modifying existing row A of record 171 is attempted, the existing row A is retained without modification and, instead, new row B is appended to relational table 120 for record 171. For example, write request 180 specifies value 153, which new row B contains in application column 131. Whereas, old row A for record 171 still retains value 151 in application column 131.

Clients cannot modify system columns 141-143, which contain row metadata. For example row identifier column 143 identifies rows A-B as separate physical rows. Whereas, record identifier column 142 indicates that rows A-B are different versions of same logical record 171. Thus, relational table 120 can store versioned history of record 171 and similarly structured records. Thus, relational table 120 is a versioned table, and record 171 is a versioned record.

Cryptographic hash column 141 stores a value in each row that is calculated by applying a cryptographic hash function to the row. A cryptographic hash value may be based on some or all of the fields of the row. Thus, the cryptographic hash value depends on the content of the row. If the content is later modified, such as by accident or intentionally, applying the same cryptographic hash function to the modified row would calculate a different hash value. A row may be audited by detecting that a currently recalculated hash value does not match the hash value stored in the row, in which case the row is not intact. Thus, relational table 120 may be somewhat tamper evident.

For multiple rows A-B that are versions of same record 171, multiple respective values in cryptographic hash column 141 for rows A-B of record 171 may be arithmetically related. For example, a cryptographic hash function may be sensitive, not only to a current row, but also to one or more older rows of the same record. For example, the cryptographic hash function may also be based on the cryptographic hash value of the previous version of the record. For example, cryptographic hash value 163 may be based on cryptographic hash value 161.

Thus, many versioned rows of a same record may be arithmetically daisy chained into a blockchain that is tamper evident. For example, versioned rows of a same record may be sorted by age and/or by version column 143, and each hash value may be verified based on hash value(s) of previous row(s). Thus, many rows of a same record may form a blockchain.

Values in cryptographic hash column are protected from updates, and DBMS 100 should forbid such an update. If security mechanisms of DBMS 100 are bypassed and a hash value in cryptographic hash column 141 is replaced, such as to hide that a row of record 171 has been tampered, either cryptographic hash value 161 will appear invalid and/or cryptographic hash value 163 of the logically next row of the record will appear invalid. Thus, a blockchain of table rows of a database record is tamper evident.

In an embodiment, a physical ordering of rows on disk of a same record need not reflect a logical ordering of those rows as versions of the record. For example, compaction of relational table 120 may entail physically reordering rows, which does not disturb the blockchain(s) of those rows. For example a physical row identifier such as a DBMS native ROWID that is not stored in version column 143 may change for a same row, such as when the row is relocated.

In an embodiment, older rows of a same logical record may be read, such as when a query specifies row identifiers such as A-B. In an embodiment and by default when historical rows are not expressly requested, the scope of a query is implicitly limited to a row that is a latest version of a record. In an embodiment, visibility of older rows of a record depends on database access permissions granted to a user. For example, only a latest version of a record may be exposed to some users.

2.0 Example Transaction

Figure 2:
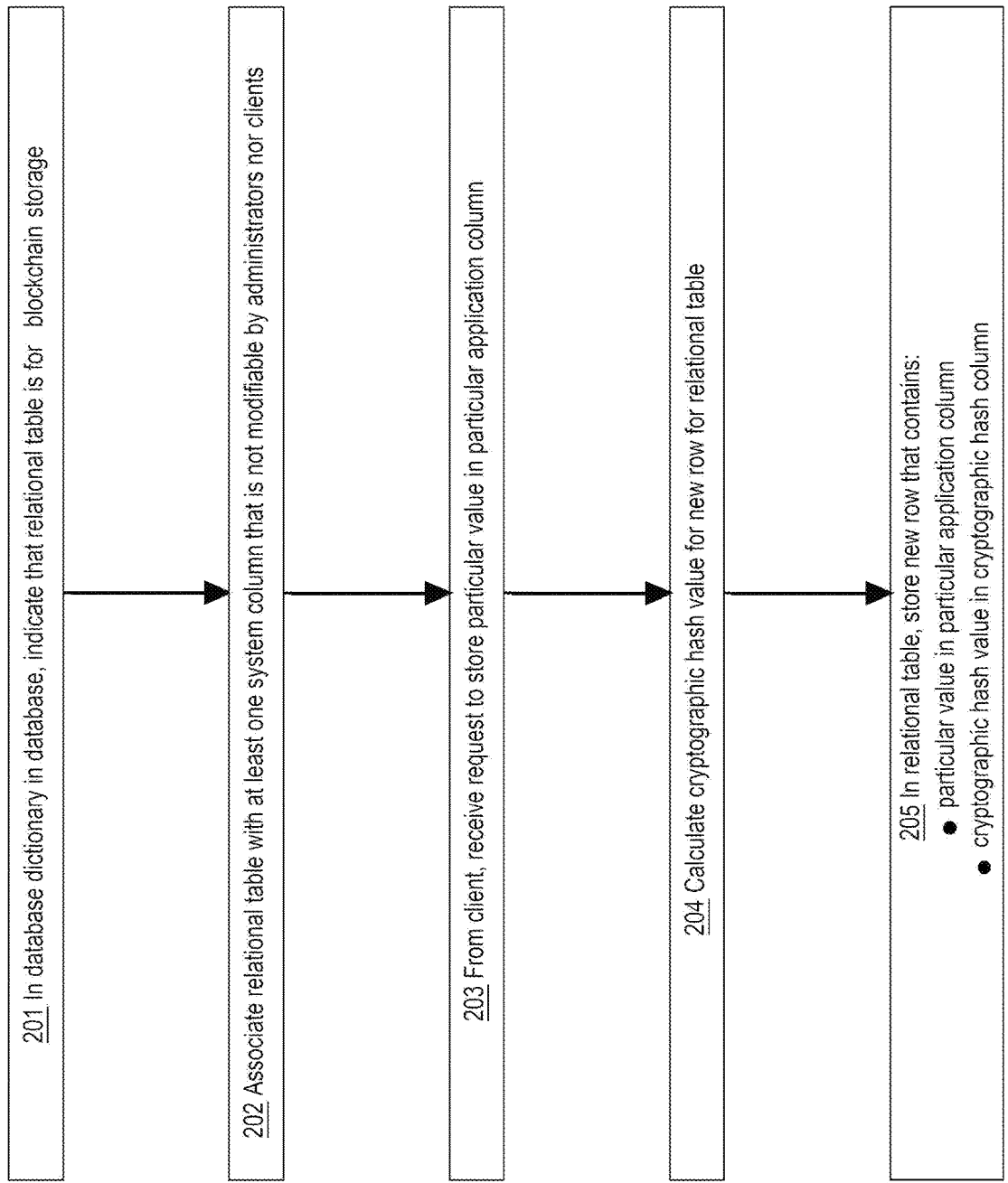
FIG. 2 is a flow diagram that depicts an example appending of a new cryptographic block onto a blockchain.

FIG. 2 is a flow diagram that depicts an example appending of a new cryptographic block onto a blockchain, in an embodiment. FIG. 2 is discussed with reference to FIG. 1.

Steps 201-202 are preparatory to configure DBMS 100 for blockchains. In a database dictionary in a database, step 201 indicates that relational table 120 is for blockchain storage. For example, DBMS 100 may receive a data definition language (DDL) statement that: a) creates new relational table 120 for blockchain storage, or b) alters existing relational table 120 for blockchain storage.

When relational table 120 is new, step 201-202 are combined. Otherwise, step 202 occurs in response to step 201. Step 202 associates relational table 120 with at least one system column that is not modifiable by administrators nor clients. For example, the system columns shown in FIG. 1 are added to the definition of relational table 120 in the database dictionary.

When relational table 120 is not new and already contains rows, various embodiments may: a) automatically calculate and store values into the new system columns, including cryptographic hash column 141; for example, version column 143 may mark all rows as a first version A of distinct new respective blockchains such as 171-172, orb) leave the new system columns uninitialized such as storing nulls. In an embodiment, the database dictionary is itself implemented by relational table(s) that store blockchains such that the database dictionary itself is versioned and/or tamper evident.

Steps 203-205 occur in sequence during live operation such as for transactions. From a client, step 203 receives request to store value 153 in application column 131. For example, the request may arrive expressed as SQL DML or other CRUD write request.

When the request arrives, version A is the only version of the blockchain and logical record with identifier 171. Processing the request preserves that row of relational table 120 as is. Step 204 calculates cryptographic hash value 163 for a new row for relational table 120 shown as version B, although the new row is not yet appended to relational table 120.

Step 204 invokes a cryptographic hash function and provides arguments such as: a) the new row not yet appended, b) some or all application column values of the new row, and/or c) some or all system column values of the new row and/or the previous row having version A and for the same logical record. At a minimum, the cryptographic hash function should be provided with all inputs needed to calculate cryptographic hash value 163 as a cryptographic link between cryptographic blocks A-B in blockchain 171.

In relational table 120, step 205 stores the new row as shown. The new row becomes the latest version of the logical record, which clients may observe. With each subsequent change, blockchain 171 may grow an additional cryptographic block, and relational table 120 may grow an additional row.

3.0 Example Table Lifecycle

The following Table 1 enumerates example lifecycle scenarios 601, 604, 608, and 612 in an example lifecycle of a tamper evident relational table. Embodiments of DBMS 100 may implement some or all of these lifecycle scenarios. Each lifecycle scenario includes at least one processing step as shown in Table 1. Steps in a same lifecycle scenario may occur in sequence as enumerated. For example, step 602 may occur before step 603. Table 1 is discussed with reference to FIG. 1.

| Lifecycle Scenario | Meaning | Steps |
|---|---|---|
| 601 | Use latest version of record | 602-603 |
| 604 | Record deletion | 605-607 |
| 608 | Maintain separate blockchain table | 609-610 |
| 612 | Expire table rows | 611 |

In lifecycle scenario 601, a latest version of a logical record is used as follows. From a client, step 602 receives a request to retrieve content of record 171 that already has versions A-B as shown in FIG. 1. For example, a query may ask what value is stored in application column 131 for record 171.

In step 603, value 153 is returned to answer the query because only latest version B of record 171 is used as a data source. Older version A is not considered unless older data is expressly requested. In an embodiment, cryptographic hash value 163 is verified whenever version B is accessed, which may or may not entail verification of cryptographic hash value 161 of previous version A. In an embodiment, blockchain 171 is verified whenever any version in blockchain 171 is accessed, which entails verifying all cryptographic hash values in blockchain 171.

Lifecycle scenario 604 entails deletion of a logical record as follows. From a client, step 605 receives a request to delete record 171, such as with an SQL DML statement or other CRUD request. Based on the cryptographic hash value of a current version of a record, step 606 calculates a new cryptographic hash value for marking the record as deleted.

Lifecycle scenario 604 does not delete any rows of the record. In the relational table of the record, step 607 appends a new row that contains: an indication that record is deleted, and the new cryptographic hash value in the cryptographic hash column of the relational table. Embodiments may or may not let some or all users detect and/or inspect old rows of a deleted record.

Lifecycle scenario 608 maintains a separate blockchain table. As discussed earlier herein, a relational table can store blockchains when the relational table contains relevant system columns. In some cases it may be infeasible or undesirable to add those system columns to that (e.g. legacy) table.

Lifecycle scenario 608 provides an alternative that instead entails creating a separate blockchain table that provides blockchain storage for ordinary table(s) during step 609. Instead of adding system columns to the ordinary table(s), the system columns are created with, or added to, the blockchain table. In other words, blockchain support may be retrofitted onto a legacy table without altering the schema or contents of the legacy table. Reading and writing occur as described earlier herein, except that access to application columns and system columns entails separate respective tables. For example, the cryptographic hash function may need values from the ordinary table and from the blockchain table. In an embodiment, two ordinary tables may share a blockchain table.

In an embodiment, step 610 deletes the blockchain table when the blockchain table is not accessed for a threshold duration. For example when auditing is needed only for a current or few recent year(s) for regulatory compliance, but many years are needed for data mining, then the blockchain table that is dedicated to an old year may eventually be dropped. For example, each year may have its own separate blockchain table, regardless of whether the ordinary records have one monolithic multiyear table or a separate ordinary table for each year.

Lifecycle scenario 612 expires old table rows, including or not including latest versions of records, depending on the embodiment. Step 611 deletes one row or a multirow horizontal data partition of a relational table when a duration since a relevant event exceeds a threshold. The relevant event may depend on which row or partition and may be creation or access of the row or partition.

As explained, scenarios 608 and 612 entail granular deletion of data such that some or all version rows of a logical record and some or all version blocks of a blockchain may be deleted. In other words, a relational table may contain truncated blockchains or, when the relational table was associated with a dropped blockchain table, records with no blockchains at all.

In that case, blockchain verification entails only retained blocks of a truncated blockchain. Likewise, an oldest retained block in the truncated blockchain may be exempt from verification. In an embodiment, the cryptographic hash value of the youngest deleted block of the truncated blockchain is preserved even though that deleted block may no longer exist as discussed later herein. Thus, even the oldest retained block in the truncated blockchain is verifiable.

4.0 Example Schema and Topology

FIG. 3 is a block diagram that depicts an example database management system (DBMS) 300, in an embodiment. DBMS 300 flexibly integrates blockchains across multiple tables and/or multiple database instances. DBMS 300 may be an implementation of DBMS 100.

Only system columns are shown, but not all. For example, a cryptographic hash column is not shown. Record identifier columns 343A-B and 346 store identifiers of logical records. For example, record X has two versions 0-1 according to columns 342A and 343A.

As explained earlier herein, a blockchain may contain different version rows of a same record in a same relational table. In that case, each row is a more or less self contained link or block in the blockchain. For example and according to chain identifier column 341A, blockchain C contains two versions 0-1 of same record X.

Also as explained earlier herein, a relational table may contain multiple blockchains that have disjoint sets of records with disjoint sets of rows. For example in relational table 331A, only record Y is in blockchain D, and none of the rows of record X are in blockchain D, because those rows in blockchain C.

In an embodiment, multiple records may occur in a same version block of a same blockchain. For example, each blockchain may represent a purchase order that may have multiple line item records. In an embodiment, each blockchain is versioned, and the blockchain and its multiple records share a same version.

For example in relational table 331A, blockchain C has two versions 0-1. Version 0 of blockchain C contains two records W-X. Whereas, version 1 of blockchain C contains only record X. For example a data manipulation language (DML) transaction such as for structured query language (SQL) may delete record W from blockchain C and/or modify record X.

Relational tables 331A and 332 may be schematically related in various ways. For a master detail pattern example, relational tables 331A and 332 are respectively a master table and a detail table. In a multidimensional database example, relational tables 331A and 332 are respectively a fact table and a dimension table. In an online analytical processing (OLAP) example, relational tables 331A and 332 are part of a star or snowflake pattern.

A block of a blockchain may span multiple relational tables. For example, same version 0 of blockchain D contains records T and Y in respective relational tables 331A and 332 that may respectively be a master table and a detail table. Each of relational tables 331A and 332 may contain a full complement of system columns, including a cryptographic hash column.

In an embodiment, some relational tables may indirectly participate in a blockchain and not have those system columns. For example, one table with such system columns and another table without such system columns may be related by a foreign key in either table. So long as the cryptographic hash function is based on content of both respective rows of both tables, both rows can be protected as a tamper evident block of the blockchain. For example, a fact table may have such system columns, but a dimension table whose rows can be shared by separate fact rows in separate blockchains of the same or different fact tables would not have such system columns.

In an embodiment, relational tables 331A and 332 may be horizontal partitions of a same logical table, such as temporal or alphabetic partitions. For example, relational table 331A may be for January transactions, and relational table 332 may be for February transactions. For example, record X and blockchain C have version 2 in February as shown. Thus, different blocks of a same blockchain and/or different versions of a same record and same blockchain may reside in different relational tables.

DBMS 300 is hosted by computers 311-312 that are interconnected by a communication network. Each of computers 311-312 host respective database instances such as 321-322 that may have same or different relational schemas. For example, relational tables 331A-B may have a same or different definition. For example, relational tables 331A-B may be shards of a same logical table such as: a) temporal shards, b) content based shards such as alphabetical shards, c) hash based shards that operate as hashed bins, and/or d) load balancing shards with insertion of rows that is sticky by row or by logical record such as with round robin, least busy, or most free storage.

Depending on the embodiment, sticky may mean that data is always stored in same relational table and/or a same database instance when the data is for: a) a particular row, b) any version row of a same logical record, or c) any record in a same block of a same blockchain. Also depending on the embodiment, some related data may be distributed. For example, the version 0 block of blockchain E contains records S and Z that are stored in separate relational tables of separate database instances.

A temporal or other set of shards may store different versions of a same record in different database instances. For example versions 0-1 of record V and blockchain F are stored in separate database instances.

5.0 Example Transactional Processing

The following Table 2 enumerates example transaction concerns 621 and 624 in an example transaction. Embodiments of DBMS 300 may implement some or all of these transaction scenarios. Each transaction scenario includes multiple processing activities as shown in Table 2. Activities 625-627 in transaction scenario 624 may occur in sequence as enumerated. For example, activity 625 may occur before activity 626. Activities 622-623 in transaction scenario 621 may occur in any order or concurrently. Table 2 is discussed with reference to FIG. 3.

| Transaction Concern | Meaning | Activity |
|---|---|---|
| 621 | Block distribution | 622-623 |
| 624 | Transactional integrity | 625-627 |

To increase data locality, decrease peer to peer database server network traffic, increase throughput, and decrease latency, a whole blockchain with all of its blocks may be pinned to one table, one data partition, and/or one database instance. This is shown as activity 623. Activities 622-623 are alternative activities for transaction concern 621 for block distribution that may affect performance. Without stickiness, different blocks of a same blockchain may be distributed across multiple tables, multiple data partitions, and/or multiple database instances by activity 622.

Transactional integrity is transaction concern 624. Simultaneous data mutations by multiple clients may accidentally corrupt any of: a field in a table row, and/or block cryptography. In some cases, a row lock may be sufficient, such as for consistent reads. DBMS 300 may support ACID transactions as explained earlier herein. Depending on the embodiment, the following transactional aspects may or may not be based on ACID mechanisms of DBMS 300.

When modifying an application column value requires appending a new table row, such modifications can be treated as table row insertions for concurrency and/or locking. In an embodiment, row insertion does not need locking because DBMS 300 implicitly serializes simultaneous inserts. In an embodiment, locking may be unneeded even when a new block of a blockchain has multiple records in same or different tables.

In an embodiment, mutual exclusion (mutex), semaphore, or critical section is needed for additional serialization, especially for cryptography. For example, two concurrent writers of a same logical record should not use a same cryptographic block as their respective previous block for chaining.

Multiple blockchains may be semantically related such as when multiple logical records of same or different relational tables are semantically related. For example, a money transfer may mean that two bank accounts are operationally related even if not schematically related. Money credited to one account should be debited from another account in an atomic way that is all or nothing such that crediting and debiting each succeed only if both succeed.

For example when each bank account has its own distinct blockchain, the money transfer should atomically update two blockchains, which may or may not be technically challenging when a bank database has only one writer. However while a bank account participates in that money transfer, concurrent writers may try to simultaneously write the account's blockchain for other financial transactions. Concurrent writers may accidentally interfere with each other, especially if one writer performs transaction rollback.

For example, one writer should not use a cryptographic block as a previous block for chaining when another writer undoes insertion of the table row(s) of that block during rollback. Thus, a transaction may need to lock multiple participating blockchains, which is an example of locking multiple resources, which is prone to deadlock.

For example, two writers I-II may contend for two blockchains III-IV. If writer I locks blockchain III, and writer II simultaneously locks blockchain IV, then deadlock occurs because neither writer can proceed without acquiring a lock that the other writer holds. A solution is for both writers to lock blockchains in a same ordering, such as blockchain III before IV. The ordering is canonical because simultaneous writers always agree on the ordering even when the writers independently calculate the ordering.

In an embodiment, a writer optimistically prepares mutation data during a database transaction but supplies a precommit callback subroutine that, when invoked in step 625: a) cryptographically hashes new blocks for the mutation data, b) calculates a canonical ordering of participating blockchains such as explained below for step 626, c) in step 627 locks participating blockchains in the canonical ordering, d) persists the blockchains, and e) unlocks the blockchains.

In an embodiment, lock ordering is based on a static convention such as blockchain age or identifier. In an embodiment, lock ordering is dynamic. For example in step 626, lock ordering is based on statistics such as: a) frequency of read, write, or either in a same time period, or b) recency of last read, write, or either.

6.0 Exemplary Embodiments

The following are exemplary embodiments that leverage various features of examples presented earlier herein. Requirements of these exemplary embodiments are not necessarily requirements of the examples presented earlier herein. In these exemplary embodiments, a relational table is configured for blockchain storage and operates as follows.

The relational table prohibits row updates and prohibits ad hoc row deletes. Aging may automatically delete rows such as described earlier herein.

System columns such as cryptography columns may be hidden or invisible. A maximum amount of blockchains in the relational table may be configured by the database system or by a database administrator (DBA).

In an embodiment, all rows inserted into same or different relational table(s) by a same database transaction or a same database session may be automatically linked together into a same blockchain. In an embodiment, each such row has its own respective block of the blockchain. In an embodiment, some or all of those rows are part of a same block of the blockchain.

In an embodiment, a block of a blockchain and/or a row of the relational table contains a cryptographic digital signature of a client. In an embodiment, the client digital signature is based on content of application column(s) but not system columns.

In an embodiment, a block of a blockchain and/or a row of the relational table contains a cryptographic digital signature of the DBMS. In an embodiment, the DBMS digital signature is based on content of application column(s) and system column(s). In an embodiment, storing the cryptographic signature of the DBMS for a set of newly added blocks of a blockchain and/or a set of newly added rows of the relational table may be deferred for a limited duration such as until a threshold amount of rows or blocks are added or until a periodic interval timer expires.

In an embodiment, verification of the cryptographic hash values in one or more blocks of a blockchain may be done by invoking a database application programing interface (API). In an embodiment, such verification may be done entirely by a database client after retrieving the hash values and without invoking the DBMS. In an embodiment, such client verification entails public keys of multiple respective digital signers. In an embodiment, multiple hash values of a same blockchain may be verified in parallel.

In an embodiment, the cryptographic hash value of block(s), especially a deleted block, of a blockchain and/or row(s), especially a deleted row, of the relational table, along with information such as identifying the blockchain and/or block, such as a position of a block within a blockchain, and/or digital signatures within the blockchain, block, or table row, may be periodically copied outside the database. This information may be stored in another database, file system, web site, decentralized blockchain, etc. This copied information can be used to: a) detect the removal of records from a blockchain or modifications to a blockchain, and/or b) more or less verify a truncated blockchain such as due to aging of older block(s).

In an embodiment, extensions to the CREATE TABLE DDL SQL statement to support blockchain-specific information. Here is sample syntax to create a blockchain ready table called "bank_ledger" in a relational database:

CREATE BLOCKCHAIN TABLE bank_ledger(bank VARCHAR2(128),
 EOD_deposit
 NUMBER)
 NO DROP UNTIL 31 DAYS IDLE
 NO DELETE UNTIL 365 DAYS AFTER INSERT
 HASHING USING "sha2_512" AND DATA FORMAT "v1"

The BLOCKCHAIN keyword specifies that the table being created should include blockchain support. The NO DROP clause controls when the table is eligible to be dropped. The NO DELETE clause controls when each row is individually eligible to be deleted according to a time period that may affect future and/or existing table rows. The HASHING clause specifies which cryptographic hash function to use. The DATA FORMAT clause specifies the layout of data that is input to the hash function.

Extensions to the ALTER TABLE DDL SQL statement can modify blockchain-specific information. Locking a table's support for blockchains uses the LOCKED keyword, either in CREATE BLOCKCHAIN TABLE or ALTER TABLE, which prevents blockchain support from being removed by a subsequent ALTER TABLE statement.

In an embodiment, the prepare-to-commit phase of a database transaction includes adding a transaction control (TC) block to a blockchain, or log record containing a blockchain. In an embodiment, a participating DBMS should not enter the prepared state for a distributed transaction, such as transaction aware (XA) transaction or other two phase commit transaction, or acknowledge such until the TC block is added.

7.0 Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary may comprise multiple data structures that store database metadata. A database dictionary may for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the column names and datatypes of the columns, and one or more files or portions thereof that store data for the table. Metadata in the database dictionary defining a procedure may specify a name of the procedure, the procedure's arguments and the return data type and the data types of the arguments, and may include source code and a compiled version thereof.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, such as Oracle Database 11g. SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/WL is a common extension of SQL used when manipulating XML data in an object-relational database.

A multi-node database management system is made up of interconnected nodes that share access to the same database. Typically, the nodes are interconnected via a network and share access, in varying degrees, to shared storage, such as with shared access to a set of disk drives and data blocks stored thereon. The nodes in a multi-node database system may be in the form of a group of computers, such as work stations and/or personal computers, that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

7.1 Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

7.2 Database Transactions

Changes to a database in a DBMS are made using transaction processing. A database transaction is a set of operations that change database data. In a DBMS, a database transaction is initiated in response to one or more database statements requesting change(s), such as a DML statement requesting an update, an insert, or a delete of table row(s). Committing a transaction refers to making the changes for a transaction permanent.

All data changes for a transaction are made atomically. When a transaction is committed, either all changes are committed, or the transaction is rolled back.

In a distributed transaction, multiple DBMSs commit a distributed transaction using a two-phase commit approach. Each DBMS locally executes a branch transaction of the distributed transaction. One DBMS, the coordinating DBMS, may be responsible for coordinating the commitment of the transaction on one or more other DBMSs. The other DBMSs are referred to herein as participating DBMSs.

A two-phase commit involves two phases, a prepare-to-commit phase and a commit phase. In the prepare-to-commit phase, a respective branch transaction is prepared in each of the participating DBMSs. When a branch transaction is prepared on a DBMS, the database is in "prepared state" such that it can guarantee that modifications executed as part of a branch transaction for the database data can be committed. This guarantee may entail storing change records for the branch transaction persistently. A participating DBMS acknowledges when it has completed the prepare-to-commit phase and has entered a prepared state for the respective branch transaction of the participating DBMS.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
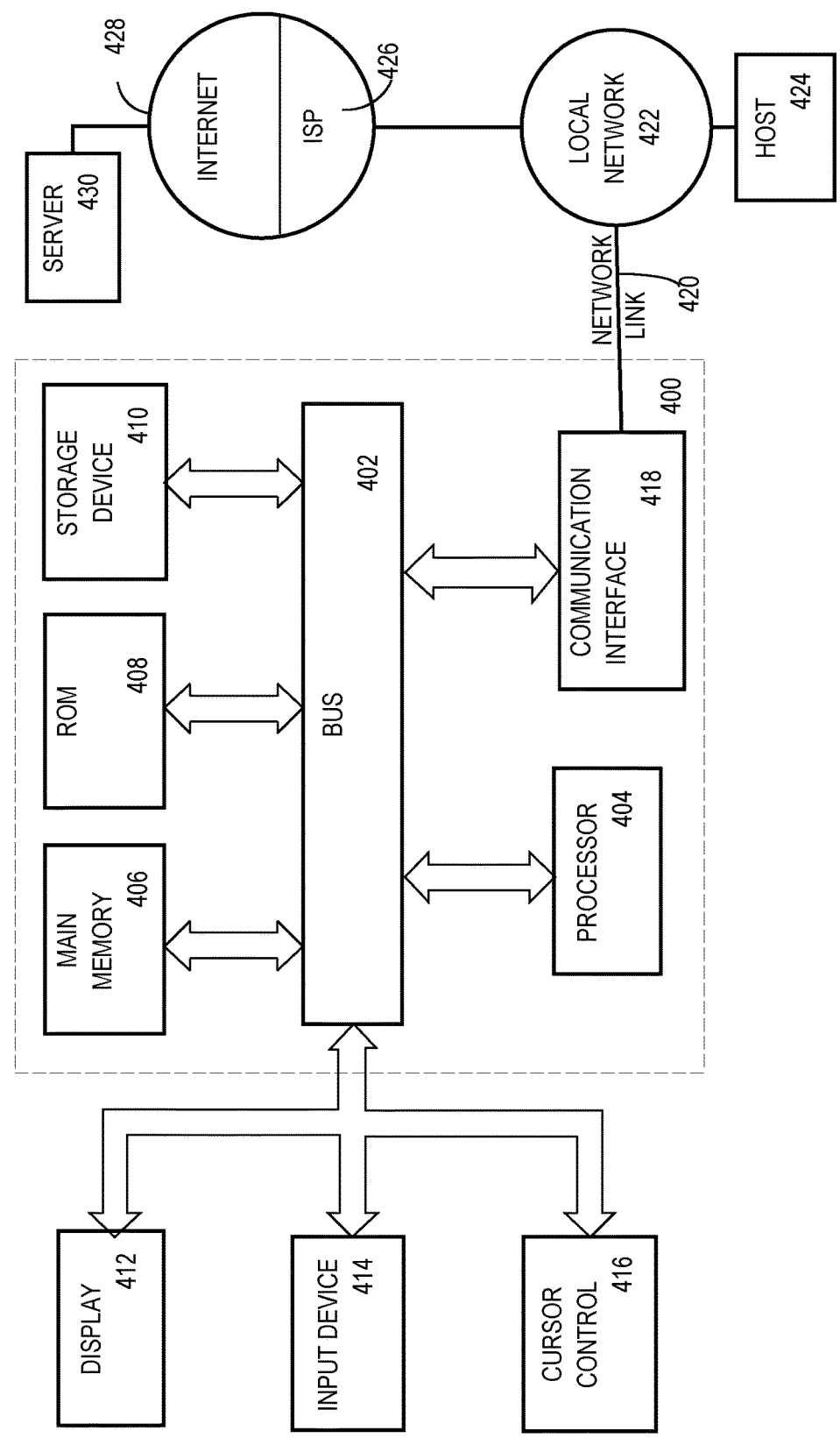
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
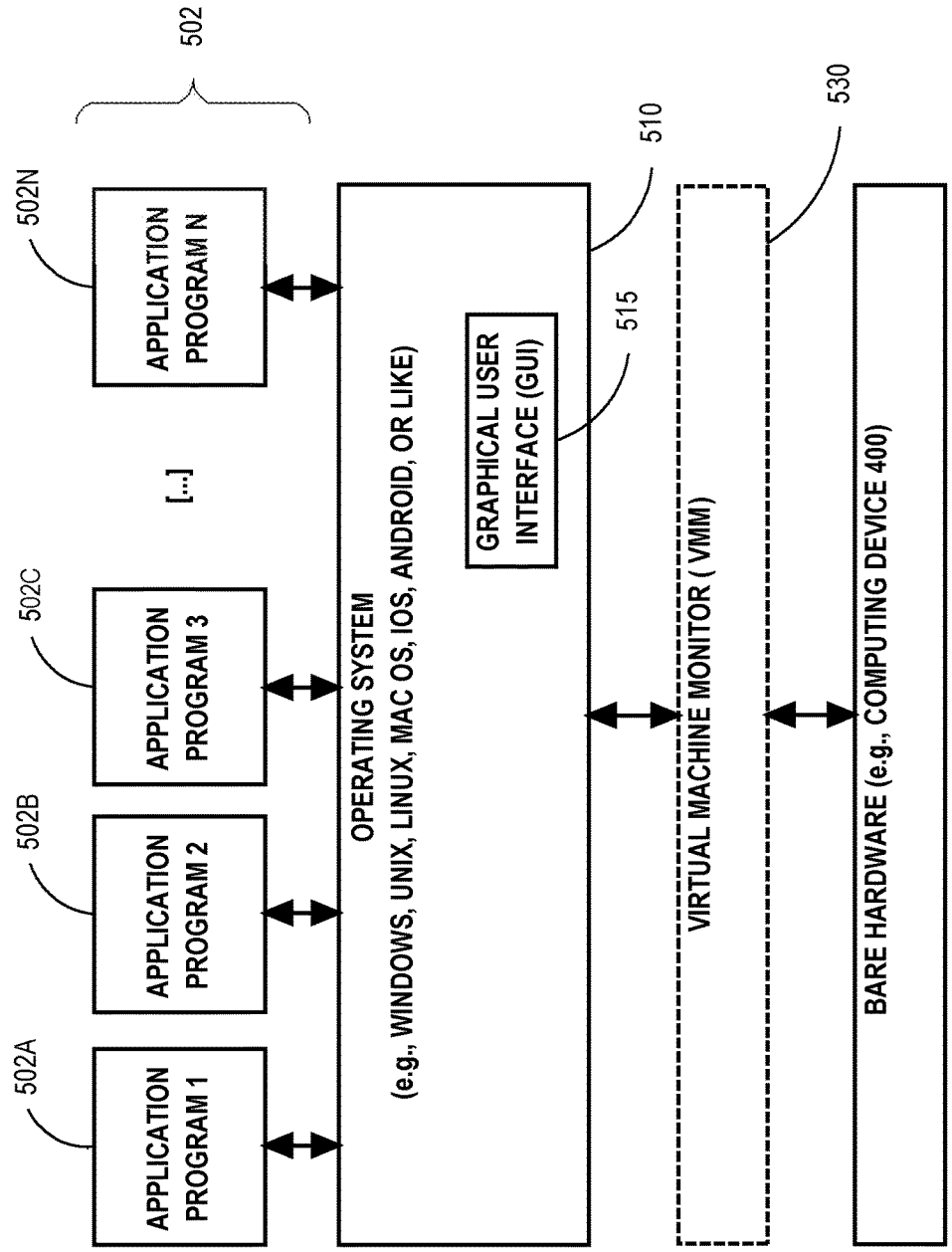
FIG. 5 is a block diagram that illustrates a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 500 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving a database command that specifies that a particular relational table is for blockchain storage;
   in response to receiving said database command:
   a) indicating, in a database, that said particular relational table is for blockchain storage, wherein the particular relational table contains at least one application column; and b) adding, to the particular relational table, at least one system column that is not modifiable by administrators and clients of the database, wherein the at least one system column includes a cryptographic hash column;

first storing, in the particular relational table, a particular row;

receiving, from a client, a request to revise a particular record, wherein the request specifies a new value to store in a particular application column of the at least one application column in the particular relational table;

calculating, in response to receiving the request, a cryptographic hash value for a new row for the particular relational table, wherein the new row and the particular row are different rows that represent said particular record; and second storing, in the particular relational table, the new row that contains the cryptographic hash value in the cryptographic hash column, wherein said second storing the new row in the particular relational table comprises storing the new value in the particular application column in the particular relational table.

2. The method of claim 1 further comprising:
receiving, from a client, a request for content of the particular record;
sending, to the client in response to receiving the request for content, content of the new row without content of the particular row.

3. The method of claim 1 further comprising:
receiving a request to delete the particular record;
storing, in the particular relational table, a second new row that contains an indication that the particular record is deleted.

4. The method of claim 1 wherein said calculating the cryptographic hash value is based on a cryptographic hash value in the particular row.

5. The method of claim 1 further comprising deleting the particular relational table when the particular relational table is not accessed for a threshold duration.

6. The method of claim 1 wherein the at least one system column in said particular relational table contains blockchain data for multiple blockchains.

7. The method of claim 6 further comprising:
distributing said blockchain data for multiple blockchains across one or more database instances;
storing said blockchain data for a particular blockchain of said multiple blockchains partially in said particular relational table and partially in a second relational table that are in a same database instance of said one or more database instances.

8. The method of claim 6 further comprising a database transaction acquiring, in a canonical ordering, for each of two blockchains of said multiple blockchains, a respective lock.

9. The method of claim 8 wherein said acquiring said respective locks of the two blockchains occurs during a pre-commit callback of said database transaction.

10. The method of claim 8 wherein said canonical ordering depends on respective access frequencies of said two blockchains.

11. The method of claim 1 further comprising deleting the particular row of the particular relational table when a duration since a particular event for the particular row exceeds a threshold, wherein the particular event is last access of the particular row.

12. The method of claim 1 wherein:
the method further comprises deleting a temporal partition of the particular relational table that contains the particular row of the particular relational table when a duration since a particular event for the particular row exceeds a threshold;
the particular event is creation of the particular row.

13. The method of claim 1 wherein said request to revise the particular record comprises a digital signature of the client.

14. The method of claim 13 wherein the digital signature of the client is based on a value already stored in the at least one system column.

15. One or more non-transitory computer-readable media storing instructions that, when executed by one or more processors, cause:
receiving a database command that specifies that a particular relational table is for blockchain storage;
in response to receiving said database command:
a) indicating, in a database, that said particular relational table is for blockchain storage, wherein the particular relational table contains at least one application column; and
b) adding, to the particular relational table, at least one system column that is not modifiable by administrators and clients of the database, wherein the at least one system column includes a cryptographic hash column;

first storing, in the particular relational table, a particular row;

receiving, from a client, a request to revise a particular record, wherein the request specifies a new value to store in a particular application column of the at least one application column in the particular relational table;

calculating, in response to receiving the request, a cryptographic hash value for a new row for the particular relational table, wherein the new row and the particular row are different rows that represent said particular record; and second storing, in the particular relational table, the new row that contains the cryptographic hash value in the cryptographic hash column, wherein said second storing the new row in the particular relational table comprises storing the new value in the particular application column in the particular relational table.

16. The one or more non-transitory computer-readable media of claim 15 wherein the at least one system column in said particular relational table contains blockchain data for multiple blockchains.

17. The method of claim 1 wherein
the particular relational table exists before said indicating that the particular relational table is for blockchain storage.

18. The one or more non-transitory computer-readable media of claim 15 wherein the instructions further cause deleting the particular relational table when the particular relational table is not accessed for a threshold duration.

19. The one or more non-transitory computer-readable media of claim 16 wherein the instructions further cause:
distributing said blockchain data for multiple blockchains across one or more database instances;
storing said blockchain data for a particular blockchain of said multiple blockchains partially in said particular relational table and partially in a second relational table that are in a same database instance of said one or more database instances.

20. The one or more non-transitory computer-readable media of claim 15 wherein:
- the instructions further cause deleting the particular row of the particular relational table when a duration since a particular event for the particular row exceeds a threshold, wherein the particular event is last access of the particular row.

21. The one or more non-transitory computer-readable media of claim 15 wherein:
- the instructions further cause deleting a temporal partition of the particular relational table that contains the particular row of the particular relational table when a duration since a particular event for the particular row exceeds a threshold;
- the particular event is creation of the particular row.

22. The method of claim 1, wherein said database command is a data definition language statement that specifies creation of said particular relational table.

23. The one or more non-transitory computer-readable media of claim 15 wherein said database command is a data definition language statement that specifies creation of said particular relational table.

\* \* \* \* \*

UNITED STATES PATENT AND TRADEMARK OFFICE
CERTIFICATE OF CORRECTION

PATENT NO. : 11,640,391 B2
APPLICATION NO. : 16/923279
DATED : May 2, 2023
INVENTOR(S) : Loaiza et al.

It is certified that error appears in the above-identified patent and that said Letters Patent is hereby corrected as shown below:

In the Specification

In Column 5, Line 21, delete "orb)" and insert -- or b) --, therefor.

In Column 12, Line 53, delete "SQL/WL" and insert -- SQL/XML --, therefor.

Signed and Sealed this
Twentieth Day of February, 2024

Katherine Kelly Vidal
*Director of the United States Patent and Trademark Office*